United States Patent [19]
Jackson et al.

[11] Patent Number: 5,432,711
[45] Date of Patent: Jul. 11, 1995

[54] INTERFACE FOR USE WITH A PROCESS INSTRUMENTATION SYSTEM

[75] Inventors: Steve T. Jackson, Norcross, Ga.; Carlo L. Gattanini, Milan, Italy; Giorgio Novelli, Milan, Italy

[73] Assignee: Elcon Instruments, Inc., Norcross, Ga.

[21] Appl. No.: 962,107

[22] Filed: Oct. 16, 1992

[51] Int. Cl.$^6$ .............................................. H01R 9/00
[52] U.S. Cl. ...................................... 364/514; 364/131; 364/709.1; 364/579; 364/550; 364/551.01; 371/15.1
[58] Field of Search ............... 364/579, 514, 509, 514, 364/131, 709.1, 550, 551.01; 361/111; 371/15.1

[56] References Cited

U.S. PATENT DOCUMENTS

| | | |
|---|---|---|
| 3,641,326 | 2/1972 | Harte . |
| 3,716,096 | 2/1973 | Berrett et al. . |
| 3,921,168 | 11/1975 | Dunbar . |
| 4,019,172 | 4/1977 | Srodes . |
| 4,082,942 | 4/1978 | Tada et al. . |
| 4,086,568 | 4/1978 | Watts, Jr. et al. . |
| 4,090,248 | 5/1978 | Swanson et al. . |
| 4,387,434 | 6/1983 | Moncrief, Jr. et al. ............ 364/509 |
| 4,399,502 | 8/1983 | MacDonald et al. . |
| 4,402,055 | 8/1983 | Lloyd et al. . |
| 4,403,297 | 9/1983 | Tivy . |
| 4,831,558 | 5/1989 | Shoup et al. . |
| 4,852,041 | 7/1989 | Nakano . |
| 4,901,218 | 2/1990 | Cornwell . |
| 4,910,658 | 3/1990 | Dudash et al. . |
| 4,928,246 | 5/1990 | Grawley et al. .................... 364/514 |
| 4,947,355 | 8/1990 | Koeman . |
| 4,954,923 | 9/1990 | Hoeflich et al. .................... 361/111 |
| 5,025,391 | 6/1991 | Filby et al. . |
| 5,079,707 | 1/1992 | Bird et al. . |
| 5,142,622 | 8/1992 | Owens . |
| 5,146,401 | 9/1992 | Bansal et al. ...................... 364/138 |
| 5,158,464 | 10/1992 | Landrini ............................ 439/49 |
| 5,251,150 | 10/1993 | Ladner et al. ..................... 364/579 |

OTHER PUBLICATIONS

*HART Smart Communication Protocol—The Rosemount Smart Family Product Data Sheet PDS 2695*, copyrighted 1990, 1991.
Romilly Bowden, *An Overview of the HART Orotocol Data Sheets*, Jan. 1991.
*HART Field Communications Protocol-Product Data Sheet PDS 2000*, Rosemount Inc., Nov. 1991.
*HART Expressway—Preliminary Data Sheet*, Rosemount Inc., Dec. 1991.
*ARCOM Control Systems Inc. Brochure*, Arcom Control Systems Ltd., copyrighted 1991.
*Data Sheet—NCR 20C12 HART Modem*, NCR Corporation, copyrighted 1991.
*Brochure—PS-1500 High Integrity Power Supply*, Elcon Instruments, dated Apr., 1992.
*Brochure—Series 1600 Plug-in Shunt Diode Safety Barriers*, Elcon Instruments, dated Jun. 1992.
*Brochure—Series 1000 Trip Amplifier*, Elcon Instruments, dated Jun. 1992.

*Primary Examiner*—Ellis B. Ramirez
*Assistant Examiner*—Thomas Pees
*Attorney, Agent, or Firm*—Banner, Birch, McKie & Beckett

[57] ABSTRACT

The present invention relates to an interface for a maintenance system used in conjunction with a process instrumentation system. More specifically, the invention relates to an interface used for maintaining and configuring smart devices. Even more specifically, the invention relates to an interface that may safely be used to maintain and configure smart devices where such smart devices are located in hazardous areas. The interface, which may be removably mounted to a termination board, has a control section, a port replacement section, a permanent storage section, a temporary storage section, an address/data bus, a UART, a standard clock pulse generation device, an option select device, a modem, a channel selection decoder, a wave shaping device, and at least one multiplexer. The interface and a termination board for use in process instrumentation systems that require intrinsic safety are explained by themselves and in system and function contexts.

13 Claims, 6 Drawing Sheets

| LINE | MUX 4 | MUX 3 | MUX 2 | MUX 1 | MUX 0 | INTRINSICALLY SAFE BARRIER CHANNEL | MULTI-PLEXER NUMBER |
|---|---|---|---|---|---|---|---|
| 1 | 0 | 0 | 0 | 0 | 0 | 1 | 105a |
|   | 0 | 0 | 0 | 0 | 1 | 2 | 105a |
|   | 0 | 0 | 0 | 1 | 0 | 3 | 105a |
|   | 0 | 0 | 0 | 1 | 1 | 4 | 105a |
|   | 0 | 0 | 1 | 0 | 0 | 5 | 105b |
|   | 0 | 0 | 1 | 0 | 1 | 6 | 105b |
| 7 | 0 | 0 | 1 | 1 | 0 | 7 | 105b |
|   | 0 | 0 | 1 | 1 | 1 | 8 | 105b |
|   | 0 | 1 | 0 | 0 | 0 | 9 | 105c |
|   | 0 | 1 | 0 | 0 | 1 | 10 | 105c |
|   | 0 | 1 | 0 | 1 | 0 | 11 | 105c |
|   | 0 | 1 | 0 | 1 | 1 | 12 | 105c |
|   | 0 | 1 | 1 | 0 | 0 | 13 | 105d |
|   | 0 | 1 | 1 | 0 | 1 | 14 | 105d |
|   | 0 | 1 | 1 | 1 | 0 | 15 | 105d |
|   | 0 | 1 | 1 | 1 | 1 | 16 | 105d |
|   | 1 | 0 | 0 | 0 | 0 | 17 | 105e |
|   | 1 | 0 | 0 | 0 | 1 | 18 | 105e |
|   | 1 | 0 | 0 | 1 | 0 | 19 | 105e |
|   | 1 | 0 | 0 | 1 | 1 | 20 | 105e |
|   | 1 | 0 | 1 | 0 | 0 | 21 | 105f |
|   | 1 | 0 | 1 | 0 | 1 | 22 | 105f |
|   | 1 | 0 | 1 | 1 | 0 | 23 | 105f |
|   | 1 | 0 | 1 | 1 | 1 | 24 | 105f |
|   | 1 | 1 | 0 | 0 | 0 | 25 | 105g |
|   | 1 | 1 | 0 | 0 | 1 | 26 | 105g |
|   | 1 | 1 | 0 | 1 | 0 | 27 | 105g |
|   | 1 | 1 | 0 | 1 | 1 | 28 | 105g |
|   | 1 | 1 | 1 | 0 | 0 | 29 | 105h |
|   | 1 | 1 | 1 | 0 | 1 | 30 | 105h |
|   | 1 | 1 | 1 | 1 | 0 | 31 | 105h |
|   | 1 | 1 | 1 | 1 | 1 | 32 | 105h |

FIG. 3

INTERFACE FOR USE WITH A PROCESS INSTRUMENTATION SYSTEM

BACKGROUND OF THE INVENTION

The present invention relates to an interface for a maintenance system used in conjunction with a process instrumentation system. More specifically, the invention relates to an interface used for maintaining and configuring smart devices. Even more specifically, the invention relates to an interface that may safely be used to maintain and configure smart devices where such smart devices are located in hazardous areas.

Modern process control systems often utilize field devices for monitoring and controlling various aspects of a process. These field devices can include level transmitters, mass flow meters, tank gauges, pressure transducers, temperature transducers, or other similar devices. Typically, these field devices output 4–20 mA signals which are operated upon to provide information regarding a process. An example of such a field device is a pressure transducer located in a storage facility filled with gasoline that periodically outputs signals that are operated upon to determine the pressure in the storage facility.

Widely used field devices that are commonly referred to as "smart transmitters" (i.e. smart field devices) are often equipped with microprocessors. These microprocessors perform two important functions: (1) process measurement, and (2) calibration, adjustment, and maintenance of the smart transmitter to within desired levels of operation. Collectively, the operations of calibration, adjustment, and maintenance shall be referred to hereinafter as "maintenance." The maintenance function is the focus of the present invention.

The smart transmitters mentioned above are usually connected to what is known in the art as a Distributed Control System (DCS), a Programmable Logic Controller (PLC), a Personal Computer (PC), or other similar control device. Collectively, DCSs, PLCs, PCs, and other similar devices shall be referred to herein as "control systems." It is common in the field of process instrumentation to have the connection of any particular smart transmitter to a control system typically be in the form of a 4–20 mA loop in which power to energize the smart transmitter is supplied from the control system.

Typically, a control system primarily receives and processes the 4–20 mA signals that are transmitted from the smart transmitters over the 4–20 mA loops. In this fashion, data about the process that is being controlled or monitored can be collected and analyzed. Additionally, typical control systems can be equipped with facilities for providing for the maintenance of the smart transmitters (i.e. the calibration, adjustment, and maintenance of smart transmitters). Control systems equipped with facilities for providing for the maintenance of smart transmitters often achieve such operations by incorporating proprietary systems and protocols for the transmission of digital maintenance data to and from the microprocessors found in the smart transmitters. With these types of control systems, only smart transmitters manufactured by the manufacturer of the control system can be used for process control due to the proprietary nature of the systems and protocols involved.

Several problems are associated with using control systems that incorporate proprietary maintenance systems and protocols for the communication of maintenance data, to and from smart transmitters. Initially, communication is commonly not done over the connection forming the 4–20 mA control loop. Instead, separate wiring systems need be installed, thus increasing maintenance cost and complexity.

Another problem is that proprietary protocols can dictate control system and smart transmitter manufacturer uniformity. That is, a plant or process facility that uses a proprietary protocol based control and maintenance system may be restricted in its ability to acquire process control equipment manufactured by differing vendors possibly rendering the plant or process facility vendor or product line dependant. Various tangential problems are associated with being vendor or product line dependant including the possibility of having to pay higher and higher prices for process control equipment due to market monopolies. Even more, being vendor or product line dependant can result in restricting a process facility's operations based on the availability and selection of process control equipment. For example, when a plant or process facility seeks to perform certain tasks, such a facility may have to re-equip to meet changing demands in running and controlling processes. Such re-equipping, in addition to possibly being impracticable, can be quite costly.

Yet another problem can be seen where a process facility, including those involving hazardous areas, may utilize several hundred, or more, smart transmitters to measure and evaluate particular processes. In these situations, wiring of the smart transmitters to both the control system and the maintenance system can become quite complicated, problematic, and costly. The wiring problem is compounded where the control system and the maintenance system each require separate wiring systems. Even in light of these wiring problems, there have been no available centralized wiring harnesses that enable users to simply and easily gain wiring access to the control and maintenance signals communicated to and from the smart transmitters.

Another problem with providing for maintenance of smart transmitters is seen where there is failure of the maintenance system in the context of control systems that incorporate maintenance systems. When the maintenance system in these systems fail, the entire control system may need to be shut down thus requiring any of the processes that are being controlled by the control system to come to a halt as well. Termination of processes can be costly as well as impracticable. Even more, where a process must be halted, it may be necessary to re-start the process once the maintenance system is again operational.

The above-mentioned problems are compounded where there is a requirement of intrinsic safety. In applications requiring intrinsic safety, smart transmitters are used in hazardous areas and the control and maintenance stations reside in a non-hazardous area. Such applications include, for example, gasoline manufacturing facilities and the like. In these applications, it can become quite difficult to adjust, calibrate, and maintain smart transmitters during a process due to the hazards involved. While intrinsically safe circuits (e.g. circuits utilizing opto-isolators, transformers, for examples) are often utilized to protect against the hazards involved in monitoring and measuring processes in hazardous areas, the range of products available for such intrinsic safety applications is quite small. Even more, these intrinsic safety circuits fail to lend themselves to easily and economically allow for maintenance of smart transmitters.

Another problem associated with currently used process instrumentation devices is seen where the control system protocols, whether proprietary or not, are incompatible with commercially available smart transmitters. Control systems within these process instrumentation systems often cannot interface with the smart transmitters and thus require the use of an additional maintenance system. These problems are compounded when intrinsic safety is required.

The above-listed problems have led the Inventors to invent solutions that are practical and economical and which are defined in the appended claims.

SUMMARY OF THE INVENTION

It is an object of the present invention to solve the above-mentioned problems by providing an interface for a maintenance system that is used in a process instrumentation system.

It is another object of the present invention to provide an interface for a maintenance system to be used in applications requiring intrinsic safety, the interface having a control section for controlling the operations of the interface, a permanent storage section for permanently storing information, a temporary storage means for temporarily storing information, a first communication section for communicating with a maintenance system that is used in a process instrumentation system, a second communication section for communicating with a maintenance information bus, an option selection section for selecting various interface operation modes, a channel selection section for selecting a channel on which is connected a smart transmitter, and a wave shaping section for changing the shape of signals output from the control section.

It is a further object of the present invention to provide for a termination board for use in a process instrumentation system which is used in applications requiring intrinsic safety wherein at least one transmitter is connected to a first side of at least one intrinsically safe barrier and relays data about a process to a control system connected to a second side of said intrinsically safe barrier and wherein the termination board has a connector for connecting together the termination board and an interface device that is used to interface smart transmitters with a maintenance work station.

It is a further object to provide a system for maintaining smart transmitters that includes a wiring harness for use in applications requiring intrinsic safety wherein smart transmitters communicate signals through intrinsically safe barriers to a control system and wherein the signals that are communicated by the smart transmitters are frequency shift keyed to bi-directionally communicate digital maintenance information with a maintenance work station.

It is another object of the present invention to provide a method of maintaining a smart transmitter located in a hazardous area.

It is another object of the present invention to provide a method of bi-directionally communicating maintenance information between a smart transmitter located in a hazardous area and a maintenance work station located in a non-hazardous area.

It is a final object of the present invention to provide a method for selecting a particular channel on which a smart transmitter located in a hazardous area may be maintained.

BRIEF DESCRIPTION OF THE DRAWINGS

The above-listed objects have been achieved and will be explained in detail below with reference to FIGS. 1-4. Here, FIGS. 1-4 are briefly described.

DETAILED DESCRIPTION OF THE PREFERRED EMBODIMENTS

What follows is a detailed description of the invention with particular regard to FIGS. 1 through 4. It should be understood that the embodiments shown in FIGS. 1 through 4 are merely exemplary of the preferences selected by the Inventors.

Figure 1:
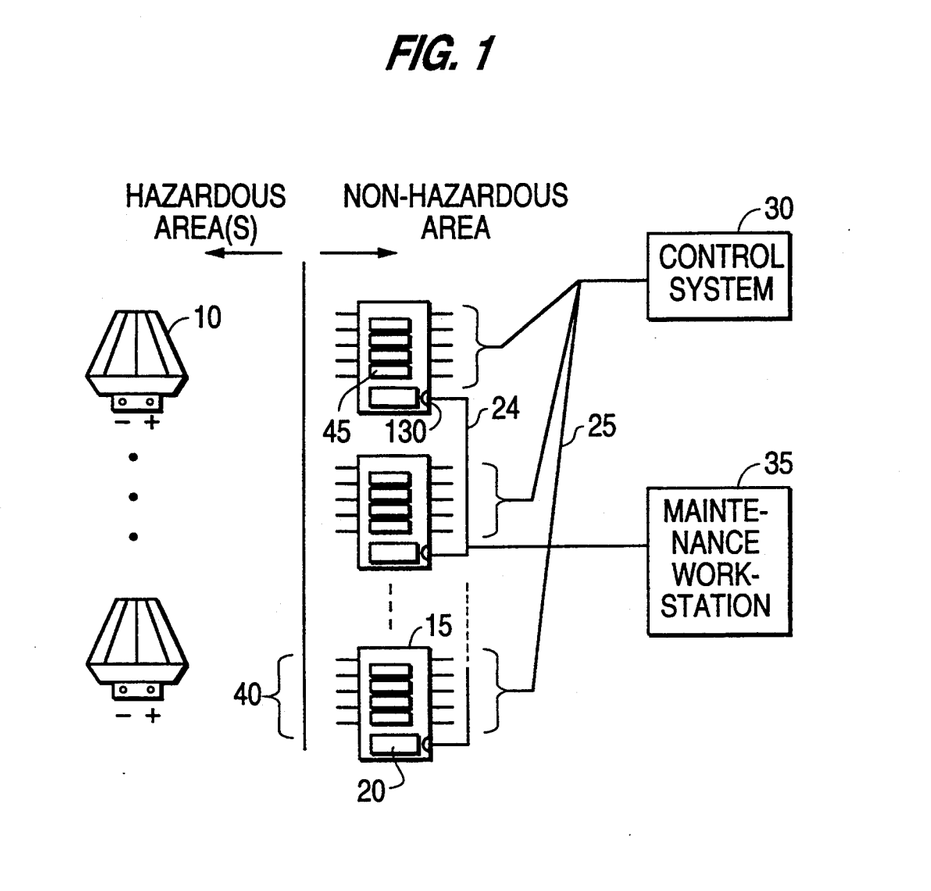
FIG. 1 is a schematic block diagram that shows a system according to the present invention comprising an interface between a plurality of transmitters and a maintenance system.

Referring now to FIG. 1, therein depicted is a block diagram that shows an exemplary system according to the present invention. More specifically, FIG. 1 shows, for example, a system used in a plant that monitors processes that require intrinsic safety. Smart transmitters 10 are located to the left of a dotted line that represents the separation between the hazardous area of a plant (i.e. that portion of FIG. 1 that is to the left of the dotted line) and the non-hazardous area of that plant (i.e. that portion of FIG. 1 that is to the right of the dotted line). Several different types of smart transmitters are often used within process instrumentation systems. These smart transmitters can include, for example, level transmitters, mass flow meters, tank gauges, pressure transducers, temperature transducers, or other similar devices. These smart transmitters are equipped with microprocessors or similar control devices that enable them to be calibrated, adjusted, and maintained to operate within desired levels of process control performance.

Also shown in FIG. 1, are a plurality of termination boards 15 which are connected to each other through interconnection of interfaces 20 as well as other forms of interconnection such as power for example. The termination boards 15 provide terminal points for connecting signal wires to the smart transmitters 10. The termination boards 15 also provide terminal points for connecting process signals 25 to a control system 30. Additionally, the termination boards 15 also house a plurality of mountable/removable cartridges that contain intrinsically safe barriers 45 which provide electronic barriers between the control system 30 and the smart transmitters 10 as well as between the maintenance system 35 and the smart transmitters 10.

The interfaces 20 are shown to be mounted on the termination boards 15, but are in fact, removable when such is desired. The fact that the interfaces 20 are mountable and removable from the termination boards 15 results in several advantages. For example, the interfaces 20, can fail while the control system remains in operation thus not requiring the termination of either control system or the processes that it is controlling and/or monitoring. Additionally, the interfaces 20, and the rest of the maintenance system may be put into operation any time after initial implementation of smart transmitters in conjunction with termination boards 15, even during the monitoring or controlling of a process as the interfaces are electrically, and otherwise, isolated from the smart transmitters 10 and ultimately from the hazardous area, as are the control system and the maintenance system. Subsequent installation of the interfaces 20 is achieved by merely acquiring a maintenance work station 35 and by mounting interfaces 20 to the termination boards 15 and connecting them as is exemplified in typical configurations of the kind shown in FIG. 1.

Where there are to be a plurality of interfaces 20 in a particular application, the interfaces 20 can be connected to each other to form a multi-drop network 24 that is used to interface the smart transmitters to the maintenance work station 35. This multi-drop network is achieved by connecting together the termination boards in parallel fashion via maintenance terminal block 130.

The maintenance work station 35 can be a personal computer or the like and can run a software package tailored for maintenance of process instrumentation equipment. Even more, the maintenance work station can be a dedicated, custom processor designed specifically for overseeing maintenance operations in a process instrumentation system. Such dedicated architecture can be achieved, for example, by way of permanently storing maintenance software in a ROM or EPROM and retro-fitting existing micro-computers or by way of particular circuitry.

The maintenance system 35 is used to maintain the smart transmitters 10 by communicating instructions and queries to and reading outputs from the smart transmitters 10 which are communicated through the interfaces 20. Generally, communication of instructions and queries to the smart transmitters is achieved by first selecting an instruction or query at the maintenance work station, communicating that instruction or query to the maintenance terminal block 130 directly or via the multi-drop network, altering the 4-20 mA signals communicated from the smart transmitter to the control system, and communicating the altered 4-20 mA signal to the smart transmitter. Also generally, communication from the smart transmitter to the maintenance work station occurs in the same way.

More specifically and in regard to the generalized discussions of the immediately preceding paragraphs, bi-directional communications between the maintenance work station 35 and the interface 20 is achieved through utilization of the RS-485 standard protocol. However, other forms of communications protocols, both parallel and serial (e.g. RS-232) could also be used for this purpose. Of course, the maintenance terminal block need be adequate in terms of the appropriate number of electrical leads in order to support whatever protocol is chosen.

Bi-directional communication between the smart transmitters 10 and the interface 20 is achieved, for example, by first Frequency Shift Keying (FSK) the 4-20 mA process signals 25 that are communicated between the control system 30 and the smart transmitters 10, and then communicating the frequency shift keyed process signals. In this fashion, traditional analog 4-20 mA signals are superimposed with a digital sequence to convey maintenance data. The FSK aspect of the present invention will be addressed in greater detail below in regard to a discussion of FIG. 4. While FSK can be used for data transmission, other forms of data transmission can be used. Such other forms of data transmission can incorporate high and low speed data transmission of a variety of types.

All communications that were discussed in the preceding paragraphs are passed over signal wires 40 and passed through the intrinsically safe barriers 45 to the maintenance work station. This result is achieved by electrically connecting the interface 20 to each of the intrinsically safe barriers on the non-hazardous side. The connection between the interfaces 20 and the intrinsically safe barriers 45 is parallel to the connection between the control system 30 and the intrinsically safe barriers 45 on the non-hazardous side. This structure is advantageous as it allows pass-through of control signals to a control system while also allowing for the communication of maintenance data via the maintenance work station 35. This pass-through feature coupled with the frequency shift keying techniques described in regard to FIG. 4, allow simultaneous communication of control information between the smart transmitters 10 and the control system 30 and bi-directional communication of maintenance information between the smart transmitters 10 and the maintenance work station 35. Note that while the barriers shown in FIG. 1 are intrinsically safe barriers, there is no prerequisite that such intrinsic safety measures be incorporated where there is no such need.

Figure 2:
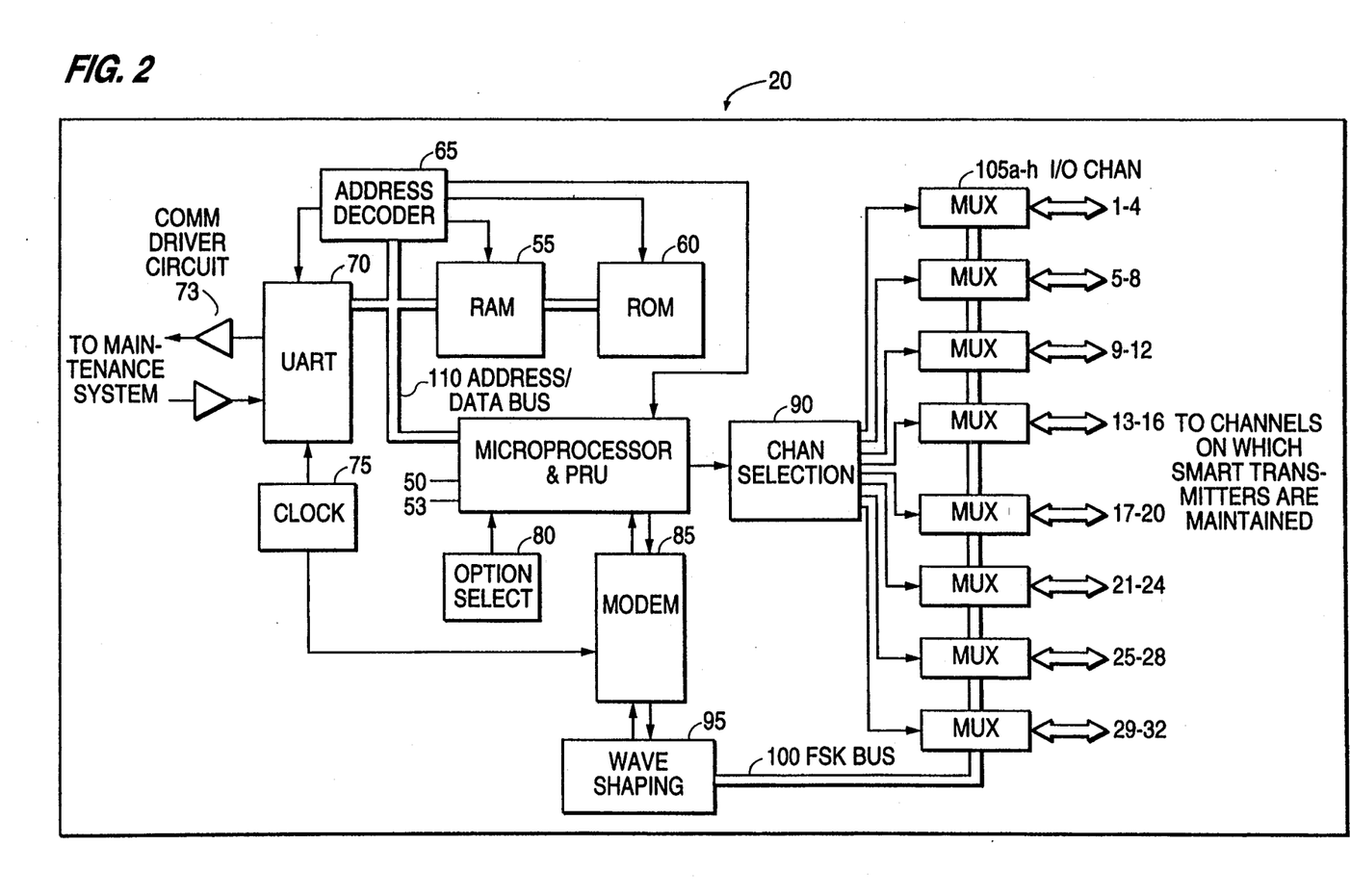
FIG. 2 is block diagram that shows a preferred embodiment of an interface of the present invention according to FIG. 1.

Referring now to FIG. 2, therein depicted is a block diagram which shows an exemplary embodiment of an interface 20 of the present invention. The interface 20 contains a microprocessor 50, a Port Replacement Unit (PRU) 53, a random access memory (RAM) 55, a read only memory (ROM), an address/data bus 110, a universal asynchronous receiver/transmitter (UART) 70 unit, a standard clock pulse generation device 75, an option select device 80, a modem 85, a channel selection decoder, a wave shaping device 95, an FSK bus 100, and eight four-channel multiplexers 105a-h. Note that while the following discussions mention the use of CMOS technology, standard TTL components can also be used.

The microprocessor 50 is connected to the RAM 55 and the ROM 60 via the address/data bus 110. The address decoder 65 is also connected to the address/data bus and provides chip selection signals (CS signals) to the RAM 55, the ROM 60, the UART 70, and the Port Replacement Unit (PRU) 53. With regard to the preferred embodiment, standard devices were chosen to implement the present invention. That is, the microprocessor 50 that was chosen was the Motorola 68HC11A1 and operates at 8 MHz. The 68HC11A1 microprocessor control unit was chosen not only for its speed and versatility but also for its additional on-chip support for peripheral capabilities. The microprocessor 50 has a 64 kByte address space. While only Motorola manufactures the 68HC11A1, the MC68HC11E1 would also work as well with only slight modification to the circuit of the interface 20. In should be understood that other microprocessors, manufactured by companies other than Motorola, may be used.

As mentioned above, in addition to having computing capabilities, the microprocessor 50 also has built-in I/O ports, timers, a serial communications interface, and interrupt circuitry. In the present invention, two of the microprocessor's 50 I/O ports (Ports B & C) were used for address/data lines. Port A of microprocessor 50 was used to provide interrupt detection. In the preferred embodiment, port B of the microprocessor 50 is used as an output port for use in the channel selection device 90. Port C of the microprocessor is used as a bi-directional port with a variety of functions including carrier detect input from the modem 85. Finally, microprocessor 50 port E provides the option select interface for use with option select device 80.

The eight address lines of the microprocessor 50 (AD0–AD7 of the Motorola 68HC11A1) are multiplexed with the eight data lines (D0–D7 of the Motorola 68HC11A1) and together with signal lines of the microprocessor 50 (lines A8--A15 of the Motorola 68HC11A1) form the address/data bus 110. In the preferred embodiment, the ROM 60, RAM 55, PRU 53, and UART 70 act as slave devices servient to the microprocessor 50.

The ROM 60 stores the program, data, and constants that are required to implement the functions of the interface 20 (i.e. interfacing maintenance communications between the smart transmitters (not shown) and the maintenance work station (not shown)). The ROM 60 that was chosen is a 32 k Byte by 8 Bit EPROM typically found in microprocessor applications. A variety of manufacturers offer such ROMS including Toshiba and Intel.

The RAM 55 stores data, program stack, messages, and other temporary information required to implement the functions of the interface 20. The RAM 55 that was chosen is a 32 k Byte by 8 Bit RAM typically found in microprocessor applications. A variety of manufacturers offer this component including Toshiba and Sony.

The PRU 53 is used to recover microprocessor 50 port B and port C signals used for address and data signal generation when the microprocessor is used in an expanded mode. In the single-chip mode of the Motorola 68HC11A1, port B is an output port and port C is a bi-directional port available to the designer. When the microprocessor is used in the expanded mode, ports B and C are used to form the address/data bus 110. The PRU that was chosen for implementation in the preferred embodiment was the Motorola MC68HC24 chip.

Address decoder 65 of the interface 20, was implemented using a gate array logic device. The address decoder's function is provide a read signal, a write signal, a RAM chip select signal, a ROM chip select signal, a UART chip select signal, and a PRU chip select signal. Together, these signals are based on the clock signal of the microprocessor 50, the read/write signal of microprocessor 50, and signals form the address/data bus 110. To implement interface 20, address decoders manufactured by National (GAL20V8-20LN), Lattice (GAL20V8-20LP), and SGS-Thomson (GAL20V8-20HC1) may be used.

The option select device 80 consists of a DIP switch and a resistor pack that is configurable to select a unit address and a baud rate upon the initiation of the initialization process of the interface 20 upon power-up or start-up. It is important to note that other structures may be used to implement the option select device 80 including, but not limited to, ROMS, jumpers, etc..

Together the UART 70 and the comm driver circuit 73 (only labelled and not shown) comprise one of the serial communication interfaces employed in the interface 20. This serial communication interface is used to communicate with a maintenance work station (not shown). The protocol of choice used to communicate over the comm driver circuit 73 was RS-485. However, other similarly adequate protocols to the RS-485 protocol can be used.

Figure 2A:
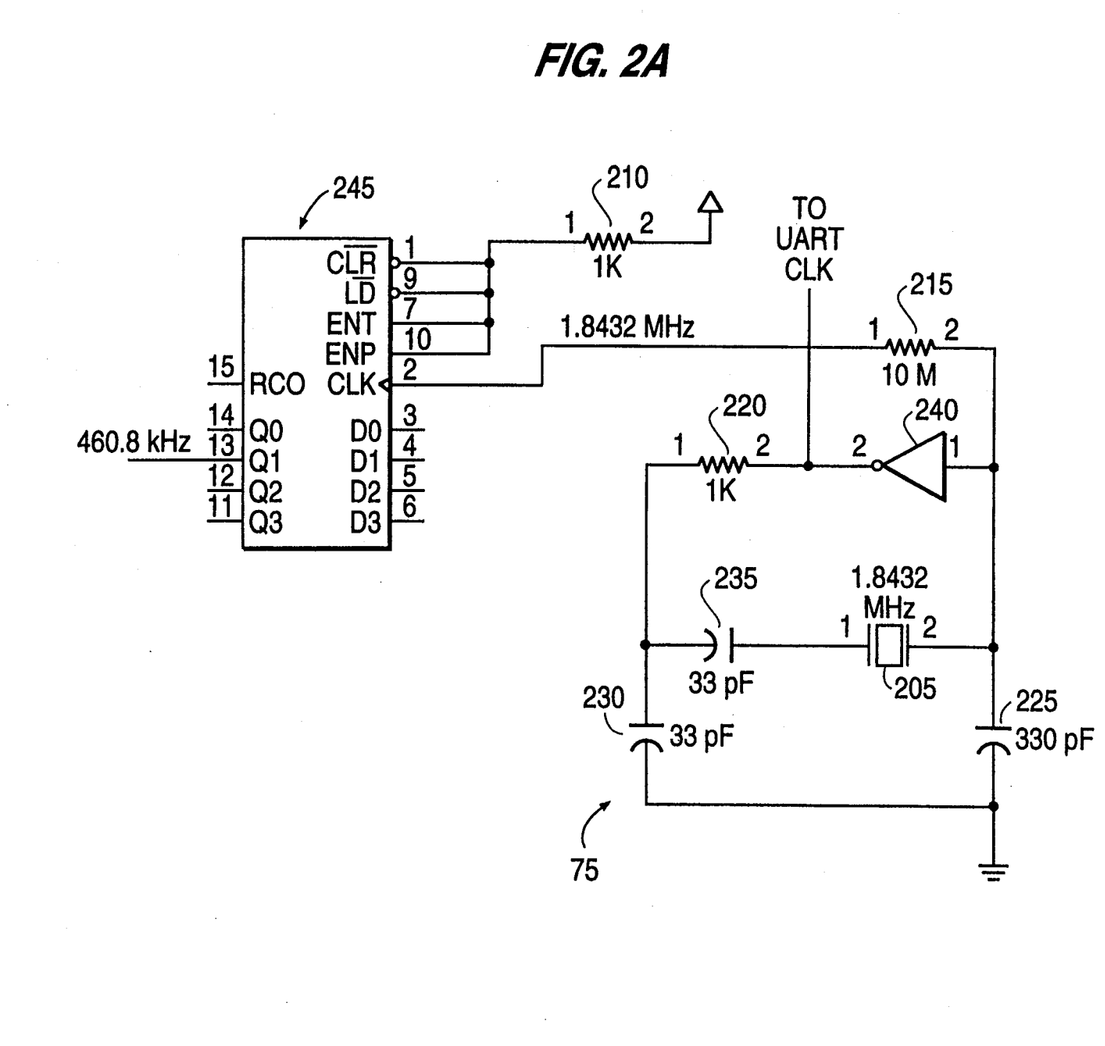
FIG. 2A is a schematic diagram of the clock pulse generation device shown in FIG. 2.

Clock pulse generation device 75 of FIG. 2 will be explained with particular reference to FIG. 2A. Shown in the schematic of FIG. 2A is a clock pulse generation device 75 that consists of a 1.8432 MHz crystal 205, resistors 210, 215, and 220, capacitors 225, 230, and 235, CMOS inverter 240, and a CMOS binary counter 245. Both the CMOS inverter 240 and the CMOS binary counter 245 are standard CMOS logic components available from a variety of manufacturers and are built with standard pin-out arrangement. While a Motorola MC74HC04 inverter was used, a National MM74HC04, a SGS-Thomson M74HC04, or a TI SN74HC04 can also be used. Additionally, while a Motorola MC74HC163 was used in the preferred embodiment, a similar chip manufactured by National (MM74HC163), SGS-Thomson (M74HC163), or a TI (SN74HC163) can also have been used.

Crystal 205, capacitors 225, 230, and 235, resistors 215 and 220 and the inverter 240 are configured to produce a square wave signal at 1.8432 MHz. This signal is communicated directly into UART 70 (See FIG. 2) for operational functionality. The 1.8432 MHz signal is also communicated to the binary counter 245 to divide the frequency down by selectable factors of two. As a result, the output of binary counter 245 is communicated directly to the modem 85 (See FIG. 2) to provide its input clock signal.

Referring back to FIG. 2, the UART 70 will now be explained. In the preferred embodiment, a 8251A UART was used. The 8251A is manufactured by several vendors including Intel (82C51), National (INS8251), NEC (uPD8251A), and Toshiba (TMP8251). The main role of the UART 70 is to provide for bi-directional communications between the maintenance work station (not shown) and the smart transmitters (not shown). Functionally, the UART 70 converts the serial logic-level signals that are received by the interface 20 from the maintenance work station via the comm driver circuit 73 into parallel data which can be processed by microprocessor 50. The UART 70 also receives parallel data from the microprocessor 50 and converts such data to serial data which can be communicated to the Maintenance work station (not shown) via the comm driver circuit 73.

In relation to the microprocessor 50, the UART 70 of the preferred embodiment acts as two 8-bit register locations. Address ADR00 of the 8251A is used to select either a Command Register or a Data Register. The 8 data bits are communicated over the address/data bus 110. The read signal, write signal, and chip select signal of the UART 70 comprise the command bus signals required to complete the interface to the microprocessor 50. These signals are generated from the address decoder 65 which will be described below. The baud rate for the various transmitter signals of the UART 70 is generated by the modem 85. The internal clock input of UART 70 is provided by the clock pulse generation device 75 previously described. The transmit data and receive data signal lines as well as the request to send signal line are connected to the comm driver circuit 73. Additionally, the receive ready signal line and the transmit ready signal line are connected to microprocessor 50 and provide for interrupts.

The modem 85 is used to communicate with the microprocessor 50 and the FSK bus 100 in order to ultimately communicate maintenance data to and from a particular smart transmitter (not shown). The modem 85 produces a Bell 202 type FSK signal. See below for a discussion of the use of FSK signals with regard to FIG. 4. The modem 85 receives a signal from the clock pulse generation device 75 which can be represented in the form of a 460.8 kHz square wave. As an output, the modem 85 produces a 19.2 kHz square wave which is used as the clock source for the UART 70. An alternative approach for the clock source for the UART 70 would be to expand the capabilities of the clock pulse generation device 75 by adding an additional binary counter identical to binary counter 245 in a cascade configuration to further divide the 1.8432 Mhz signal down to 19.2 kHz. The modem used in the preferred embodiment is the NCR NCR20C12.

Functionally, the output data stream produced by the microprocessor 50 is connected to the modem input leads. Similarly, the input serial data stream produced as modem 85 output is connected to the microprocessor's 50 data input leads.

The FSK signal that is produced by modem 85 is communicated to a wave shaping device 95. More specifically, the modem 85 outputs a signal represented by a square wave which is operated upon by the wave shaping device to achieve a signal represented by a sine wave. It is well known in the art to alter signals to have them approach a sine wave by filtering the signals. Even more, it is well known in the art to utilize structure in the form of passive or active in-line filters to achieve wave-shaping, for example.

The FSK signal output from the wave shaping device 95 is communicated to the FSK bus 100. The FSK bus 100 is connected to each of the 8 four-channel multiplexer chips 105a–h. In the preferred embodiment, as each of the eight four-channel multiplexers can direct communication to up to four channels, a total of 32 communication paths can result. Each communication path is a communication path to and from a smart transmitter. In addition, as several interfaces 20 can be connected to form a multi-drop network of interfaces, many more than 32 communication paths can be accessed in the present invention. The interconnection of interfaces 20 is further discussed below in regard to FIG. 3.

While the FSK signal that is produced by modem 85 and wave shaping device 95 is communicated to each of the 8 four-channel multiplexers, a particular channel on which a particular smart transmitter is found must be accessed. Channel selection is made possible by channel selection device 90. In the preferred embodiment, channel selection device 90 consists of a CMOS 3 line to 8 line decoder which decodes to one of eight four-channel multiplexer lines. However, depending on the number of multiplexers and ultimately the number of channels on which smart transmitters are maintained, the dimensions of the decoder can be implemented accordingly. Even more, more than one decoder can be used. In the preferred embodiment, the channels can range in value from 1 to 32. Therefore, two additional lines are passed which identify the particular channel of each multiplexer and, in turn, of each channel of a particular intrinsically safe barrier. That is, the multiplexers 105a–h are used to select the intrinsically safe barrier channel on the termination board (not shown) that is to communicate with the modem 85. While the preferred embodiment has space for 16 barrier cartridges each of which can contain up to two intrinsically safe barriers and thus provide upto two intrinsically safe communication paths, the present invention is modifiable to any particular set of specifications for any particular process instrumentation system (see generally the discussion of FIG. 1 above). Note that the CMOS 3 to 8 decoder of channel selection device 90 and the multiplexers 105a–h used in the preferred embodiment shown in FIG. 2 are available from several manufacturers including, but not limited to, Motorola (Decoder: MC74C138, Multiplexer: MC74HC4052), SGS-Thomson (Decoder: M74HC138, Multiplexer: M74HC4052), National (Decoder: MM74HC138, Multiplexer: MM74HC4052), and TI (Decoder: SN74HC138, Multiplexer: SN74HC4052). While all of the previously listed devices will work, it should be understood that any decoder and any multiplexers that provide for the functionality described herein and that are needed to meet particular specifications, are capable of being used.

The FSK bus 100 shown in FIG. 2 carries signals FSK0 and FSK1 that originate at the wave shaping device 95. These two signals are switched as pairs by the multiplexers 105a–h. The outputs of the multiplexers 105a–h are connected to a barrier interface circuit for each intrinsically safe barrier channel (not shown).

Figure 2B:
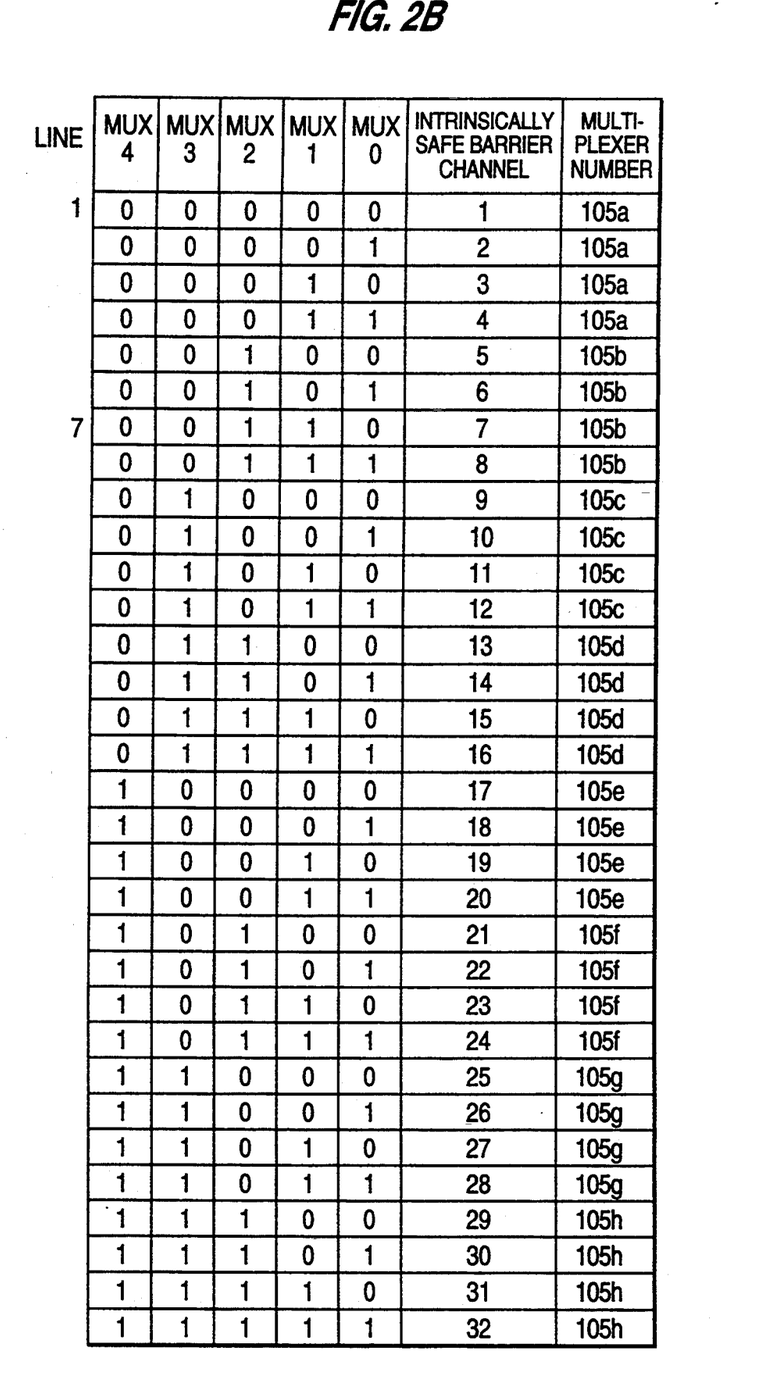
FIG. 2B is a table that shows the logical truth assignments for selecting a channel on which a smart transmitter may be maintained.

The particular channel selection scheme carried out in part by channel selection device 90 in conjunction with multiplexers 105a–h will now be described and supported by several examples by paying particular regard to FIG. 2B. The five multiplexer channel selection signals are designated MUX4 through MUX0 and are generated by the PRU 53 at the command of the microprocessor 50. MUX2, MUX3, and MUX4 have logical values of either 0 or 1 and collectively designate a particular one of eight four-channel multiplexers 105a–h with which to communicate. MUX0 and MUX1 are used to select a particular channel of the selected one of the eight four-channel multiplexers 105a–h. On each of the selected channels a smart transmitter can be connected. Such a smart transmitter is maintained over its selected channel. For example, in looking to the first line of the table of FIG. 2B, multiplexer signal lines MUX4 through MUX2 as well as MUX1 and MUX0 have been set to logical value 0 by PRU 53. As such, intrinsically safe barrier channel 1 will be selected for communication via multiplexer 105a. That is, the FSK signals communicated over FSK bus 100 will be directed to a smart transmitter connected to intrinsically safe barrier channel 1.

In yet another example, line 7 shows that multiplexer signal lines MUX4 through MUX0 have been set to the following logical values by the PRU 53: MUX4-0, MUX3-0, MUX2-1, MUX1-1, and MUX0-0. As such intrinsically safe barrier channel 7 will be selected for communication via multiplexer 105b. That is, the FSK signals communicated over FSK bus 100 will be directed to a smart transmitter connected to intrinsically safe barrier channel 6.

Figure 3:
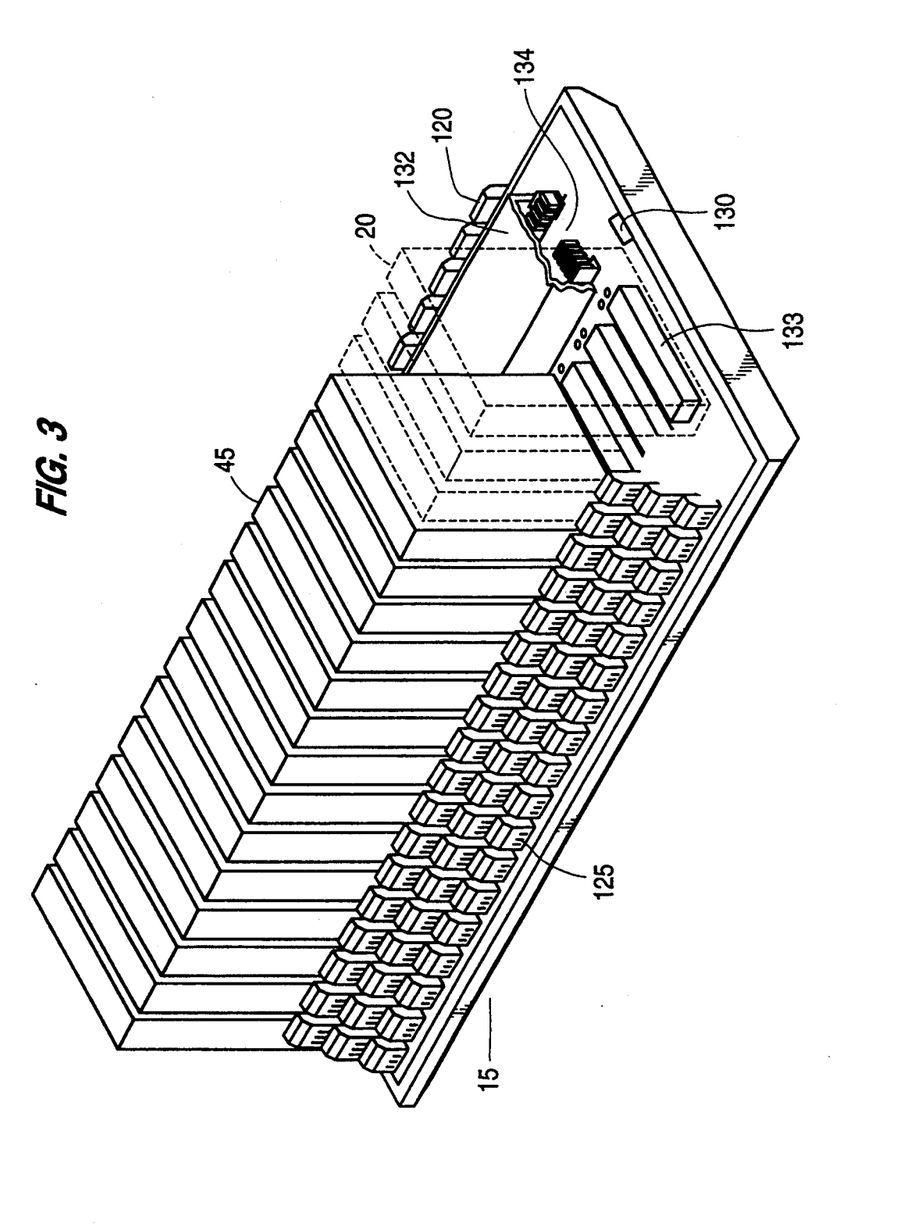
FIG. 3 is a block diagram that shows a preferred embodiment of a termination board of the present invention which includes an interface according to FIG. 2 which allows for the maintenance of smart transmitters.

Referring now to FIG. 3, therein depicted is a block diagram of a termination board according to a preferred embodiment of the present invention. Termination board 15 houses a series of removably mountable intrinsically safe barriers 45, termination blocks referenced singularly by reference numeral 125, termination blocks referenced singularly by reference numeral 120, a connector 133 for connecting an interface 20 to the termination board 15, an interface 20 for interfacing smart transmitters to a maintenance work station (not shown), and a maintenance terminal block 130. In addition, the termination board 15 shown in FIG. 3 is enhanced with a cross-wiring section 134 for cross wiring intrinsically safe channels to particular smart transmitters, and a shield 132 for covering the cross-wiring section 134. The particular features and advantages of enhancing the termination board 15 with a cross-wiring section are discussed in great detail in U.S. Pat. No. 5,158,464 which is incorporated herein by reference.

The intrinsically safe barriers 45 of the preferred embodiment are housed in a cartridge package that easily mounts to and is removable from the termination board 15 through use of standard male to female socket systems known in the art. Each of the sixteen cartridge packages can contain up to two intrinsically safe barriers 45 thus providing up to 32 intrinsically safe barriers in this preferred embodiment. Note however, that more than two channels can be placed in the cartridges should such structure be desired. Even more, note that more or less than 16 cartridges can be implemented.

Terminal blocks of the kind 125 (located on the left-hand side of the termination board 15) may be used for connection with smart transmitters which may possibly be located in hazardous areas. While the arrangement of terminal blocks 125 in this embodiment may run down the left-hand side of the termination board 15, other arrangements may be suitable depending upon the particular design specifications and the target application.

Terminal blocks of the kind like 120 (located on the right-hand side of the termination board 15) are used for connection with a control system which may possibly be located in a non-hazardous area. While the arrangement of terminal blocks 120 in this embodiment may run down the right-hand side of the termination board 15, other arrangements may be suitable depending upon the particular design specifications and the target application.

Interface 20 mounts onto termination board 15 in much the same way as do the cartridges that contain the intrinsically safe barriers 45. The interface 20 is electrically connected in parallel fashion to all of the intrinsically safe barriers 45. As will be discussed below, the interface 20 is able to communicate with the smart transmitters (not shown) by frequency shift keying (FSK) the signals communicated to and from the smart transmitters (not shown). Even more, if the interface 20 fails for any reason, the control system 30 will still operate since the interface 20 does not interfere with communications from the smart transmitters (not shown) to the control system. This result is achieved by electrically connecting the interface 20 to each of the intrinsically safe barriers 45. The connection between the interfaces 20 and the intrinsically safe barriers 45 is parallel to the connection between the control system 30 and the intrinsically safe barriers 45. This structure is advantageous as it allows "pass-through" of control signals to a control system while also allowing for bi-directional communication of maintenance with the maintenance work station 35. This pass-through feature coupled with the frequency shift keying techniques described in regard to FIG. 4, allow simultaneous communication of control information between the smart transmitters 10 and the control system 30 and bi-directional communication of maintenance information between the smart transmitters 10 and the maintenance work station 35.

Maintenance terminal block 130 is used to connect the maintenance work station (not shown) to the termination board 15. The maintenance terminal block 130 is connected to the comm driver circuit (not shown) of the interface 20. Maintenance terminal block 130 is shown in FIG. 3 as a board mount connector of the male-to-female type. However, any type connector will work so long as it allows for ample electrical connection.

Not shown in FIG. 3, but certainly integral to the termination board 15, are a terminal block for connection to a 24 Volt DC power supply and at least one fuse.

Enhancements to the termination board 15 can include the replacement of the terminal blocks 120 and 125 with a custom connector designed for use with a specific control system (i.e. DCS, PLC, PC, etc.). Such an enhancement would reduce installation costs and provide a for a more integrated system design. Another enhancement is the addition of a cross-wiring section 134 which would allow a user to redirect the signals coming from a hazardous area to meet the requirements imposed by the wiring configuration of the control system thereby eliminating the need for separate marshalling cabinets (see above for a discussion of the cross-wiring feature).

Figure 4:
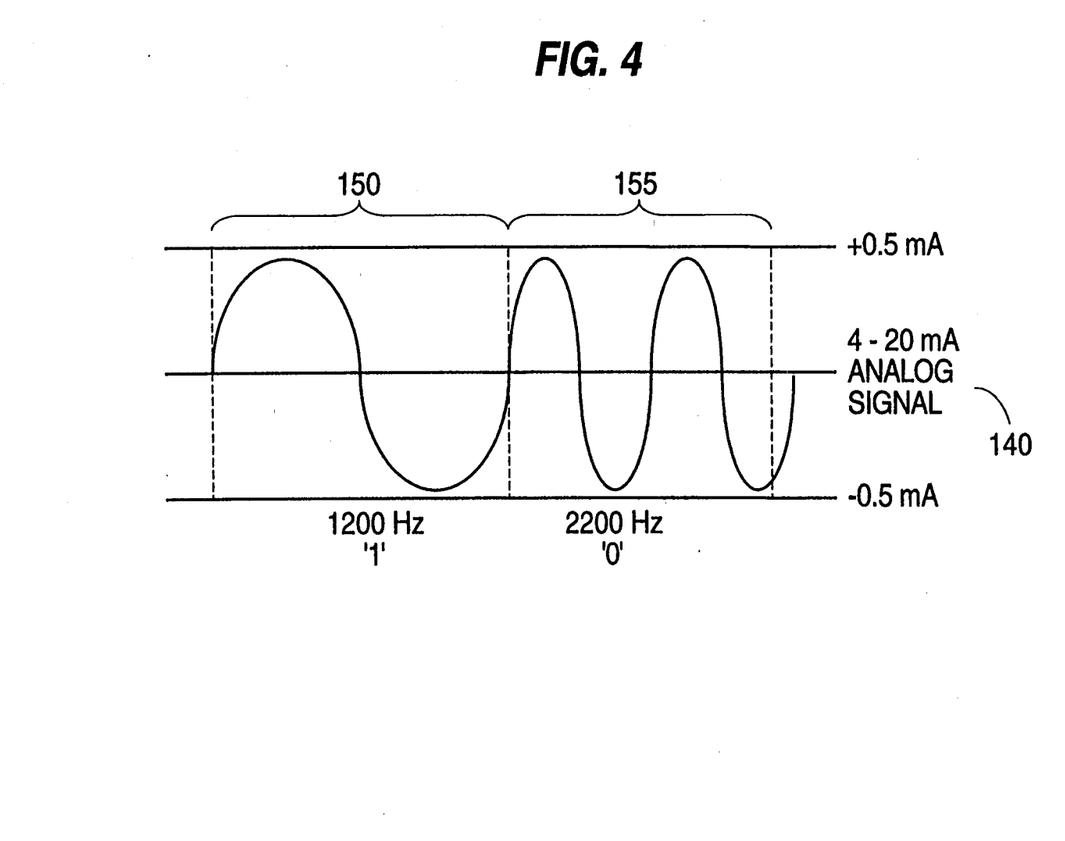
FIG. 4 is a graph that shows a frequency shift keyed signal used to carry both digital data and analog data in a system according to the present invention.

Referring now to FIG. 4, therein depicted is a graph of a traditional 4–20 mA analog signal 140 used for both process control and maintenance in a system as in FIG. 1. The 4–20 mA signal 140 is of the type communicated between the smart transmitters (FIG. 1) and the control system (FIG. 1). Additionally, the 4–20 mA signal of FIG. 4 has been frequency shift keyed (FSK) to allow for further communication between the smart transmitters (not shown) and the maintenance work station (not shown). This latter form of bi-directional communication between the smart transmitters and the maintenance work station is digitally based communication. That is, digital communication via frequency shift keying is accomplished by superimposing a frequency signal over the 4–20 mA signal 140. In the preferred embodiment, frequencies of 1200 Hz and 2200 Hz are communicated to represent the binary digits 1 (shown at section 150) and 0 (shown at section 155) respectively. Under this communication scheme, the 1200 Hz and 2200 Hz frequencies form a sine wave as shown in FIG. 4. Since the average value of a sine wave is zero, no direct current (DC) need be added to the 4–20 mA signal thus resulting in no effect on the 4–20 mA signal 140 that is eventually received by the control system. As a result of communicating between the smart transmitters and the maintenance work station in this fashion, true simultaneous communication can occur without interruption of any on-going processes. The FSK communication protocol just mentioned is based on the Bell 202 modem standard. For a generalized discussion of frequency shift keying principles and techniques, see generally Horwitz & Hill: *The Art of Electronics*, Cambridge University Press, Copyright Cambridge Unversity Press 1980, §13.18, page 579.

While the preferred embodiment has incorporated frequency shift keying based on the Bell 202 standard through utilizing 1200 Hz and 2200 Hz, other frequencies can be used. Even more, the use of other higher or lower frequencies to bi-directionally communicate maintenance information between smart transmitters (FIG. 1) and a maintenance work station (FIG. 1) will not interfere with the communication of control information from the smart transmitters (FIG. 1) and the control system (FIG. 1). For a general discussion of a sampling of some of the possible frequencies that may be used in frequency shift keying applications, see *Telecommunications Transmission Engineering*, Vol. 1—Principles, Bell System Center for Technical Education, AT&T Bell Laboratories, Copyright 1974, pages 373–375.

From the paragraphs above, it will be obvious to one of ordinary skill in the art that numerous modifications may be made without departing from the spirit and scope of the invention which is to be limited only by the appended claims.

We claim:

1. Apparatus mountable onto a termination board for use with a plurality of removably mountable intrinsically safe electronic barriers each of which couples a different microprocessor-equipped smart device in a first area to a process controller in a second area, each smart device generating process control information onto a control loop indicative of a condition in said first area and including means for receiving a maintenance command over said control loop for performing a maintenance operation, said apparatus comprising:

selecting means for selecting one of a plurality of outputs each connectable to one of said plurality of intrinsically safe electronic barriers, such that each output when selected electrically connects to one of said control loops used for transmitting process control information between a corresponding smart device and said process controller;

generating means for generating a frequency shift key modulated signal modulated in accordance with a maintenance command to be transmitted to one of said smart devices; and a microprocessor, coupled to said selecting means and said generating means, for controlling said selecting means to select one of said plurality of outputs and providing said frequency shift key modulated signal to a control loop corresponding to said selected one output, wherein said frequency shift key modulated signal modifies a process control signal on said control loop corresponding to said selected one output without interfering with process control information transmitted over said control loop corresponding to said selected one output; and means for removably mounting said means for selecting, said means for generating, and said microprocessor onto said termination board in a manner substantially similar to the manner in which said plurality of removably mountable intrinsically safe electronic barriers are removably mounted onto said termination board.

2. The apparatus of claim 1, further comprising a second apparatus adapted to be removably mounted onto a second termination board for use with a second plurality of removably mountable intrinsically safe electronic barriers each of which couples a different smart device located in said first area to said process controller, said second apparatus for generating a second frequency shift keyed signal for one of said second plurality of removably mountable intrinsically safe electronic barriers, wherein said first and second apparatus each comprises an RS-485 interface for receiving maintenance commands from a maintenance processor over an RS-485 link.

3. The apparatus of claim 1, wherein said means for removably mounting comprises a single rectangular housing having a connector on one face, said single rectangular housing disposed to mount said apparatus in parallel with said plurality of intrinsically safe electronic barriers on said termination board.

4. The apparatus of claim 1, further comprising an option select device, coupled to said microprocessor, for selecting a unit address and a baud rate for communicating with a maintenance processor.

5. Apparatus mountable onto a termination board having means for receiving a plurality of removably mountable intrinsically safe electronic barriers each of which couples a different microprocessor-equipped smart device located in a hazardous area to a process controller located in a safe area, each smart device generating process control information onto a control loop indicative of a condition in said hazardous area and including means for receiving a maintenance command over said control loop for performing a maintenance operation, said apparatus comprising:

an assembly adapted to be removably mounted onto said termination board comprising a multiplexer having a plurality of outputs each connectable to one of said plurality of intrinsically safe electronic barriers, such that each output when selected electrically connects within one of said intrinsically safe electronic barriers to one of said control loops used for transmitting process control information between a corresponding smart device and said process controller;

an FSK modem, coupled to said multiplexer, for generating a frequency shift key modulated signal modulated in accordance with a maintenance command to be transmitted to one of said smart devices;

a microprocessor, coupled to said multiplexer, for controlling said multiplexer to select one of said plurality of outputs and providing said frequency shift key modulated signal to a control loop corresponding to said selected one output, wherein said frequency shift key modulated signal modifies a process control signal on said control loop corresponding to said selected one output without interfering with process control information transmitted over said control loop corresponding to said selected one output; and means for removably mounting said assembly to said termination board in a manner substantially similar to the manner in which said plurality of removably mountable intrinsically safe electronic barriers are mounted onto said termination board.

6. The apparatus of claim 5, wherein said removable mounting means comprises a rectangular housing having a connector on one face, said rectangular housing and connector disposed to mount said assembly in parallel with said plurality of removably mountable intrinsically safe electronic barriers on said termination board.

7. The apparatus of claim 5, wherein each of said multiplexer outputs is coupled to and electrically connects to one of said plurality of intrinsically safe electronic barriers on the safe side of the barrier.

8. The apparatus of claim 5, further comprising means, disposed on said termination board, for connecting said microprocessor to a second microprocessor located on a second termination board, said connection being in parallel with a maintenance workstation which generates said maintenance command.

9. The apparatus of claim 5, further comprising a cross-wiring section, mounted to said termination board, for cross-wiring one of said intrinsically safe electronic barriers to a particular smart device.

10. The apparatus of claim 5, wherein said microprocessor receives said maintenance command from a maintenance processor through the use of an RS-485 protocol.

11. The apparatus of claim 5, further comprising a second apparatus adapted to be removably mounted onto a second termination board having means for receiving a second plurality of removably mountable intrinsically safe electronic barriers each of which couples a different second smart device located in said hazardous area to said process controller located in said safe area, each second smart device generating process control information onto a second control loop indicative of a condition in said hazardous area and including means for receiving a maintenance command over said second control loop for performing a maintenance operation, said second apparatus comprising:

a second assembly adapted to be removably mounted onto said second termination board, comprising a second multiplexer having a plurality of second outputs each connectable to one of said second plurality of intrinsically safe electronic barriers, such that each second output when selected electrically connects within one of said second intrinsically safe electronic barriers to one of said second control loops used for transmitting process control information between a corresponding second smart device and said process controller;

a second FSK modem, coupled to said second multiplexer, for generating a second frequency shift key modulated signal modulated in accordance with a second maintenance command to be transmitted to one of said second smart devices; and a second microprocessor, coupled to said second multiplexer, for controlling said second multiplexer to select one of said plurality of second outputs and providing said second frequency shift key modulated signal to a control loop corresponding to said selected one second output, wherein said second frequency shift key modulated signal modifies a process control signal on a control loop corresponding to said selected one second output without interfering with process control information transmitted over said second control loop corresponding to said selected one second output;

means for removably mounting said second assembly to said second termination board in a manner substantially similar to the manner in which said second plurality of removably mountable intrinsically safe electronic barriers are mounted to said second termination board; and means for electrically connecting to said apparatus of claim 42 and to a maintenance processor over an RS-485 link.

12. The apparatus of claim 5, further comprising a plurality of said removably mountable intrinsically safe electronic barriers mounted on said termination board.

13. Apparatus mountable onto a termination board for use with a plurality of removably mountable intrinsically safe electronic barriers each of which couples a different microprocessor-equipped smart device in a first area to a process controller in a second area, each smart device generating process control information onto a control loop indicative of a condition in said first area and including means for receiving a maintenance command over said control loop for performing a maintenance operation, said apparatus comprising:

an FSK modem for generating a frequency shift key modulated signal modulated in accordance with a maintenance command to be transmitted to one of said smart devices;

a microprocessor, coupled to said FSK modem, for selecting one of said control loops and causing said frequency shift key modulated signal to be superimposed onto said selected one control loop, wherein said frequency shift key modulated signal modifies a process control signal on said selected one control loop without interfering with process control information transmitted over said selected one control loop; and a rectangular housing having a connector on one face, said rectangular housing for enveloping and removably mounting said microprocessor and said FSK modem onto said termination board in a manner substantially similar to the manner in which said plurality of removably mountable intrinsically safe electronic barriers are removably mounted onto said termination board.

* * * * *